A. W. BRASH.
SNAP HOOK.
APPLICATION FILED MAY 14, 1910.

979,641.

Patented Dec. 27, 1910.

Witnesses
J. Milton Jester
Annie Cooper

Inventor
A. W. Brash
By C. Page Jones & Co.
Attorney

UNITED STATES PATENT OFFICE.

ALBERT W. BRASH, OF NEWARK, SOUTH DAKOTA.

SNAP-HOOK.

979,641. Specification of Letters Patent. Patented Dec. 27, 1910.

Application filed May 14, 1910. Serial No. 561,344.

*To all whom it may concern:*

Be it known that I, ALBERT W. BRASH, a citizen of the United States, residing at Newark, in the county of Marshall and State of South Dakota, have invented certain new and useful Improvements in Snap-Hooks, of which the following is a specification.

This invention relates to a snap-hook for quickly attaching and detaching various parts of a harness, and which is known as the positive hitch.

The object of my invention is to provide a snap-hook of simple construction provided with positively engaging or locking parts, and which may be quickly and conveniently operated for attaching or detaching a hitching strap or other parts of a harness.

The details of construction of my improved hook are shown in the accompanying drawing, in which—

Figure 1:
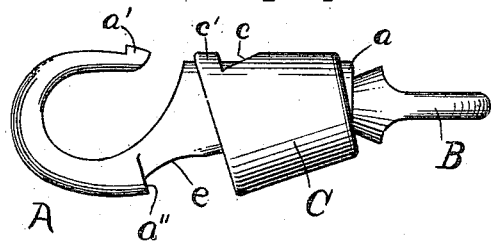
Figure 2:
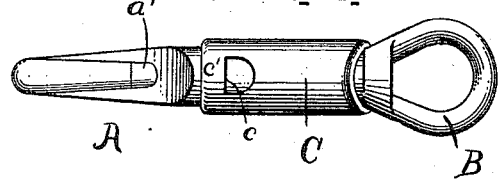
Figure 3:
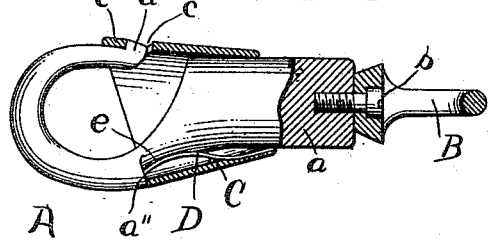
Figure 4:
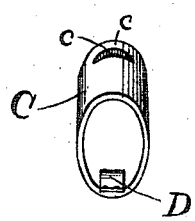

Figure 1 represents a side view, with the locking sleeve in the open position. Fig. 2 represents an edge view of the same. Fig. 3 represents a sectional side view showing the locking sleeve in the closed position. Fig. 4 represents an end view of the locking sleeve.

The hook A, provided with a shank $a$, is preferably made of malleable cast iron or steel. The extremity of its bill is provided with an outward projection $a'$ for engaging the sliding and locking sleeve. At the rear edge of the hook and near the shank is provided a shoulder $a''$ as a bearing for the end of a spring in the sleeve. The rear end of the shank is provided with an eye B which may be made rigidly with the shank or connected thereto by a rivet or a screw bolt $b$ as shown, to form a swivel joint. The rear edge of the shank is made flat as a guide way for a curved spring and at the base of the hook has a concaved surface $e$ to serve as a seat for the curved portion of the spring D.

The sliding locking sleeve C is made tapering with both ends open and having its interior opening conforming to the shape of the shank and sufficiently wide at the front end to slide over the projection $a'$ on the bill of the hook. Adjacent to the forward end of the sleeve is formed a recess or notch $c$ adapted to receive the projection $a'$ and adjacent to this recess is formed a catch $c'$ adapted to engage the projection $a'$ and securely lock the parts together.

To the back inner side and at the inner end of the sleeve is riveted or otherwise secured a curved spring D which projects to the forward end of the sleeve and is adapted to slide upon the flat rear edge of the shank and to drop into the concavity $e$ as the sleeve is slid forward. In the act of sliding the sleeve C forward to lock it on the bill of the hook, the curved end of the spring D passes into the concaved portion $e$ to permit the front end of the sleeve to readily ride over the projection $a'$ till the catch $c'$ passes beyond the projection, and toward the end of this forward movement the end of the spring slides up the inclined portion of the concavity, thereby drawing the catch $c'$ inward against the bill and the end of the spring will bear against the shoulder $a''$ which serves as a stop for the sleeve.

The snap-hook with the sleeve in the closed and locking position, shown in Fig. 3, makes a secure and safe fastening device for a hitching strap or rope, or other part of a harness and is termed a positive hitch.

Since my sliding sleeve surrounds the shank and contains an interior spring, it can be readily operated by a mitten covered hand in cold weather, so as to lock it in place or to press it forward and unlock it and slide it back on the shank for attaching or detaching a strap.

Having described my invention, what I claim, and desire to secure by Letters Patent, is—

1. The combination with a shank having at one end a swivel eye and at the other end a hook provided with an outward projection at the extremity of its bill, the shank also having a concave bearing for a spring, of a sliding sleeve having secured to its rear inner side a curved spring adapted to bear on the concave portion of the shank and at its front end at the opposite side a recess and catch for engaging with said projection on the bill, said spring serving to hold the parts in engagement.

2. A shank and hook, the latter having a shoulder on its rear edge near the shank, and an outward projection on its bill, in combination with a sliding sleeve having a curved spring secured to its rear inner side and a recess and catch at the front end of its opposite side adapted to slide over and engage with said projection, while the end of the spring bears against said shoulder.

In testimony whereof I affix my signature in presence of two witnesses.

ALBERT W. BRASH.

Witnesses:
  A. WRIGHT,
  B. A. GRIMM.